(12) United States Patent
Bendall

(10) Patent No.: US 6,414,305 B1
(45) Date of Patent: Jul. 2, 2002

(54) AUTOMATED SYSTEM FOR DETERMINING MINIMUM RESOLVABLE TEMPERATURE DIFFERENCES

(75) Inventor: Charles S. Bendall, La Mesa, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/286,715

(22) Filed: Apr. 6, 1999

(51) Int. Cl.$^7$ .............................................. G12B 13/00
(52) U.S. Cl. .................................................. 250/252.1
(58) Field of Search ........................ 250/252.1; 702/116

(56) References Cited

U.S. PATENT DOCUMENTS 5,726,915 A * 3/1998 Prager et al. ............... 702/116

\* cited by examiner

Primary Examiner—Constantine Hannaher
Assistant Examiner—Shun Lee
(74) Attorney, Agent, or Firm—Harvey Fendelman; Michael A. Kagan; Peter A. Lipovsky

(57) ABSTRACT

An automated system determines the minimum resolvable temperature difference of a thermal imager with respect to a background scene. The system comprises: a) a thermal energy for generating thermal signals; b) at least one pattern mask for transforming the thermal signals into thermal image signals; c) a thermal imager for detecting and transforming the thermal image signals into transformed signals; and d) a computer for determining the minimum resolvable temperature difference of the thermal imager using the transformed signals. A display coupled to the computer may be used to present the minimum resolvable temperature difference in human readable form.

2 Claims, 6 Drawing Sheets

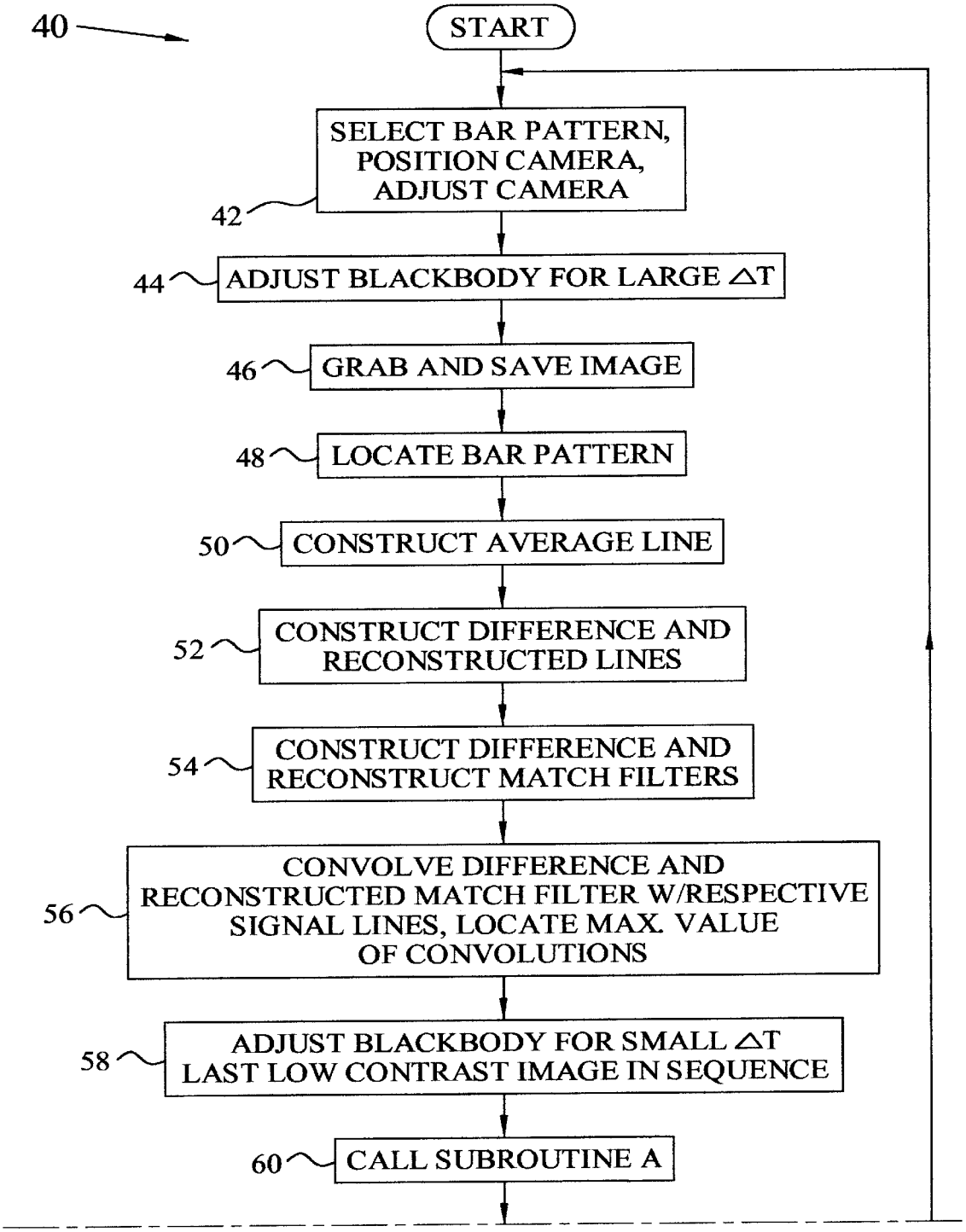

US 6,414,305 B1

AUTOMATED SYSTEM FOR DETERMINING MINIMUM RESOLVABLE TEMPERATURE DIFFERENCES

REFERENCE TO COMPUTER PROGRAM LISTING APPENDIX

Appendix 1 is a computer program listing which is submitted on one compact disc that is referenced and incorporated herein by reference. Appendix 1 comprises a single file, Aomrtd, which was created on Oct. 25, 2001 and includes 26.2 KB.

BACKGROUND OF THE INVENTION

The present invention generally relates to a system and method for determining the minimum resolvable temperature difference of a thermal imager. Trained human operators currently measure minimum resolvable temperature differences (MRTDs). The equipment used to measure MRTDs generally includes a black body thermal energy source, a collimator, a series of masks in which a four bar pattern has been milled and the thermal imager being tested. The width of and spacing between the bars of the mask varies between masks. The output of the black body passes through the slits in the mask and are collimated by the collimator. The thermal imager images the mask. The temperature difference between the mask and thermal energy source creates an intensity difference. The temperature of the black body thermal energy source is raised above ambient temperature to produce a bright four-bar pattern on the thermal imager. The human operator lowers the temperature of the black body until the four-bar pattern is no longer observed. The difference between the temperature of the thermal energy source and ambient background temperature is the MRTD for that particular bar pattern. A new bar pattern then is inserted and the procedure is repeated. When the test is completed, a plot generally is made of the MRTD vs. the width of the bars. This type of test is time consuming and expensive. Moreover, the results are highly subjective and not readily repeatable. A further shortcoming of determining MRTDs using standard test methods is that the results are not applicable to performance automated target detection computer algorithms.

Therefore, a need exists for an automated system for determining MRTDs that provides standardized, objective, and repeatable results.

SUMMARY OF THE INVENTION

The present invention provides an automated system that determines the minimum resolvable temperature difference of a thermal imager source with respect to a background scene. The system comprises: a) a thermal energy for generating thermal signals; b) at least one pattern mask for transforming the thermal signals into thermal image signals; c) a thermal imager for detecting and transforming the thermal image signals into transformed signals; and d) a computer for determining the minimum resolvable temperature difference of the thermal imager from the transformed signals. A display coupled to the computer may be used to present the minimum resolvable temperature difference in human readable form.

The invention may also be characterized as a method for determining the minimum resolvable temperature difference of a thermal imager with respect to a background scene. The method includes the steps of: a) generating a series of thermal signals; b) transforming the thermal signals into thermal image signals; c) transforming the thermal image signals into transformed signals; and d) determining a minimum resolvable temperature difference of a thermal imager from the transformed signals.

The invention provides repeatable results for determining MRTDs of the same as well as different types of sensor arrays. The use of the invention makes performance comparisons of such sensors more meaningful by eliminating interpretation of results by human operators. These and other advantages of the invention will become more apparent upon review of the accompanying drawings and specification, including the claims.

BRIEF DESCRIPTION OF THE DRAWINGS

FIGS. 4A, and 4B collectively illustrate a flow chart of an algorithm implemented by the computer depicted in FIG. 1.

Throughout the several views, like elements are referenced using like references.

DESCRIPTION OF THE PREFERRED EMBODIMENT

Figure 1:
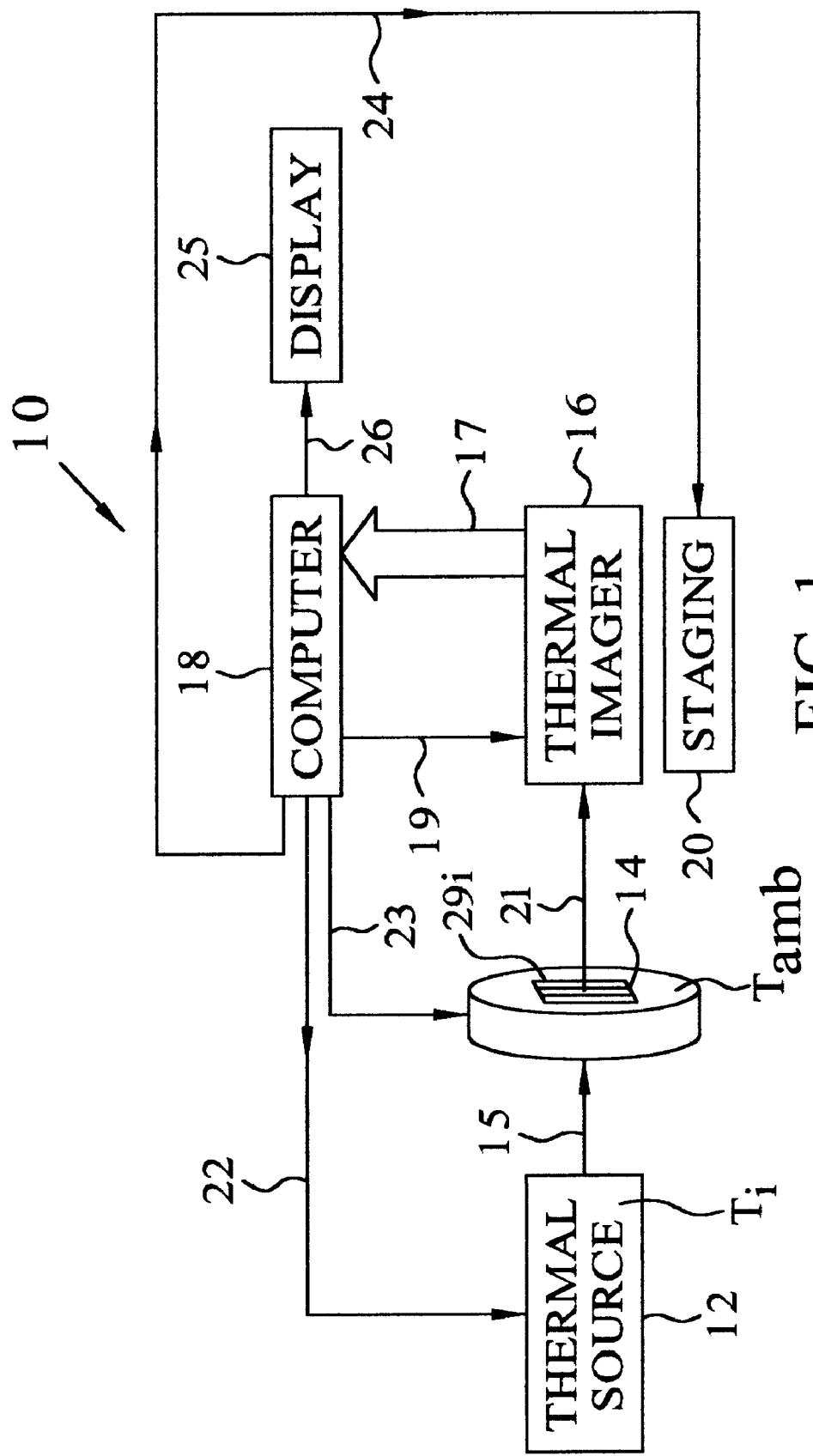
FIG. 1 illustrates a block diagram of an automated system for determining the minimum resolvable temperature difference between a thermal energy source and the ambient environment that embodies various features of the present invention.
Figure 2:
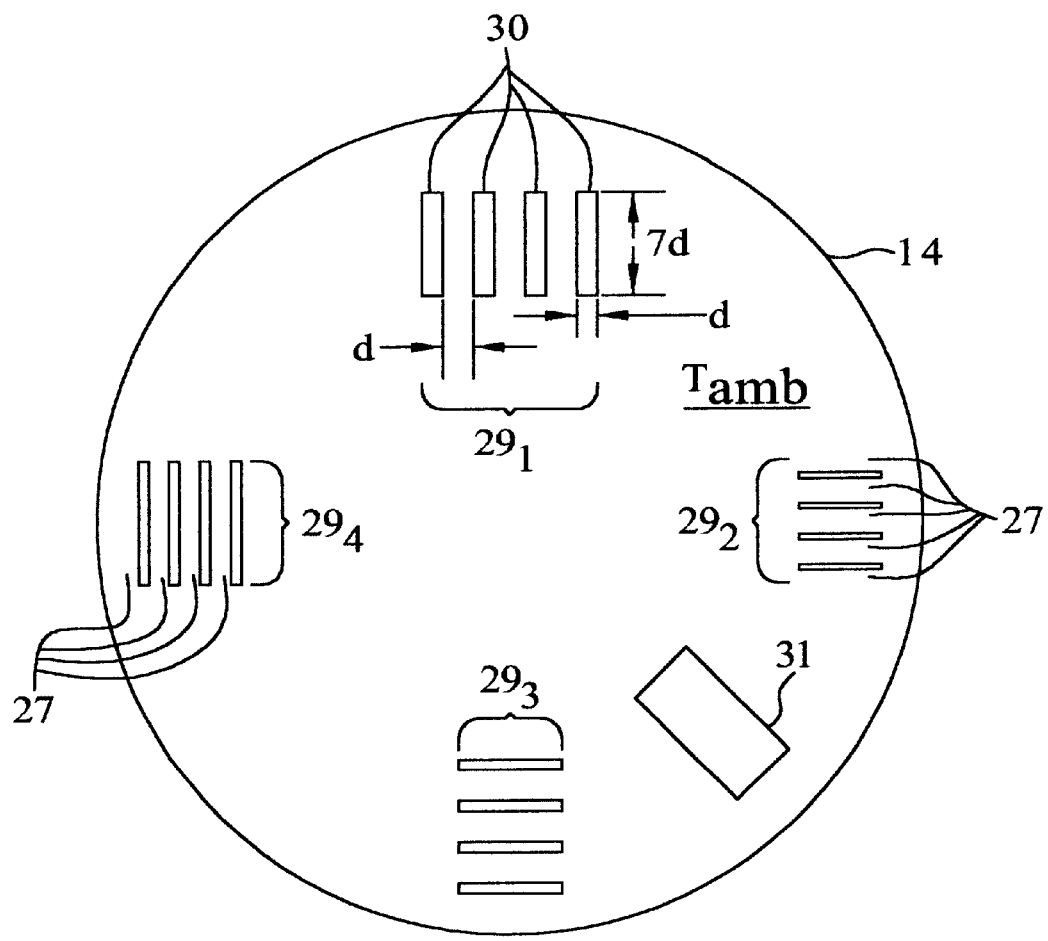
FIG. 2 illustrates a view of a target wheel having pattern masks that may be used in conjunction with the system of FIG. 1.

Referring to FIG. 1, the present invention is directed to an automatic system 10 for determining the minimum resolvable temperature difference (MRTD) between a thermal energy source and a background scene. System 10 includes a thermal energy source 12, target wheel 14, thermal imager 16, staging 20, and computer 18. As shown in FIG. 2, target wheel 14 includes, by way of example, multiple four bar pattern masks $29_1$, $29_2$, $29_3$, and $29_4$, and one empty slot 31. Each pattern mask $29_i$ includes four slots 30 having a width d, a length 7d, that are separated from each other by distance d, where i is an index. For purposes of illustration, target wheel 14 is shown to include four pattern masks. However, it is to be understood that target wheel 14 may include any integral number of pattern masks necessary to suit the requirements of a particular application.

Figure 3:
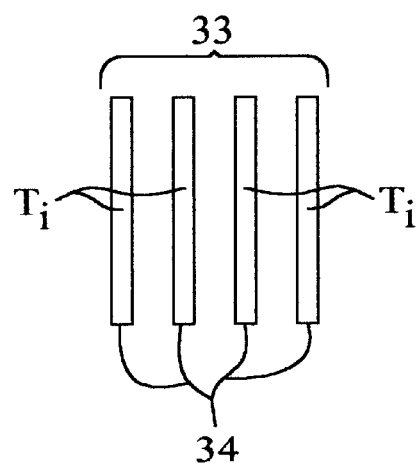
FIG. 3 shows a bar pattern resulting from thermal energy radiated through a four bar pattern mask.

Referring again to FIG. 1, computer 18 generates control signal 23 which indexes target wheel 14 to interpose a selected pattern masks $29_i$ between thermal energy source 12 and thermal imager 16. Thermal energy source 12 generates thermal energy signal 15 under the supervision of control signal 22 generated by computer 18 to achieve a predetermined temperature $T_i$ having a specific temperature difference $\Delta T$ between thermal energy source 12 and the ambient temperature $T_{amb}$ of region 27. Region 27 is the area of target wheel 14 adjacent to apertures 30 of each pattern mask $29_i$, and is used as a reference background scene. Thermal energy signal 15 is directed through parallel apertures 30 of a selected one of pattern masks $29_i$, shown in FIG. 2. Each of pattern masks $29_i$ transforms thermal energy signal 15 into a z-bar pattern signal 21, where z represents the number of apertures 30 of a mask pattern $29_i$. For example, since pattern mask $29_1$, $29_2$, $29_3$, and $29_4$ each have four apertures 30, then pattern signal 21 may appear as bar pattern image 33 consisting of four bright infrared radiation bars 34, as shown in FIG. 3.

The brightness of infrared radiation bars 34 is dependent on the mean temperature differential (MTD) between the thermal energy source 12 and the surrounding region 27 of target wheel 14. As the MTD increases, radiation bars 34 of pattern image 33 become brighter and more readily distinguishable. However, as the MTD decreases, radiation bars 34 become dimmer. At some small temperature differential between the temperature of energy source 12 and $T_{amb}$, radiation bars 34 become indistinguishable from the surrounding ambient region 27. The temperature differential at which the radiation bars 34 become indistinguishable from the surrounding region 27 is referred to as the minimum resolvable temperature differential (MRTD) of thermal imager 16 for the particular mask pattern $29_i$ under test.

Thermal imager 16 detects and transforms pattern signal 21 into a transformed signal 17 that is subjected to signal processing by computer 18, such as a Pentium® based personal computer. Transformed signal 17 represents the detected pattern image 33. Thermal imager 16 preferably is mounted on three axis staging 20 under the control of computer 18 via positioning signal 24. Thus, computer 18 may control the position of thermal imager 16 in order to align thermal imager 16 with respect to mask pattern 14 so that thermal imager 16 may detect z-bar pattern signal 21. Computer 18 may also control the focus and other operational settings of thermal imager 16 via signal line 19, and further includes a frame grabber card that is used to digitize and store a pattern image of a pattern mask $29_i$ as detected by thermal imager 16. A computer having a frame grabber is available, by way of example, from Santa Barbara Infrared, Inc.

Figure 4B:
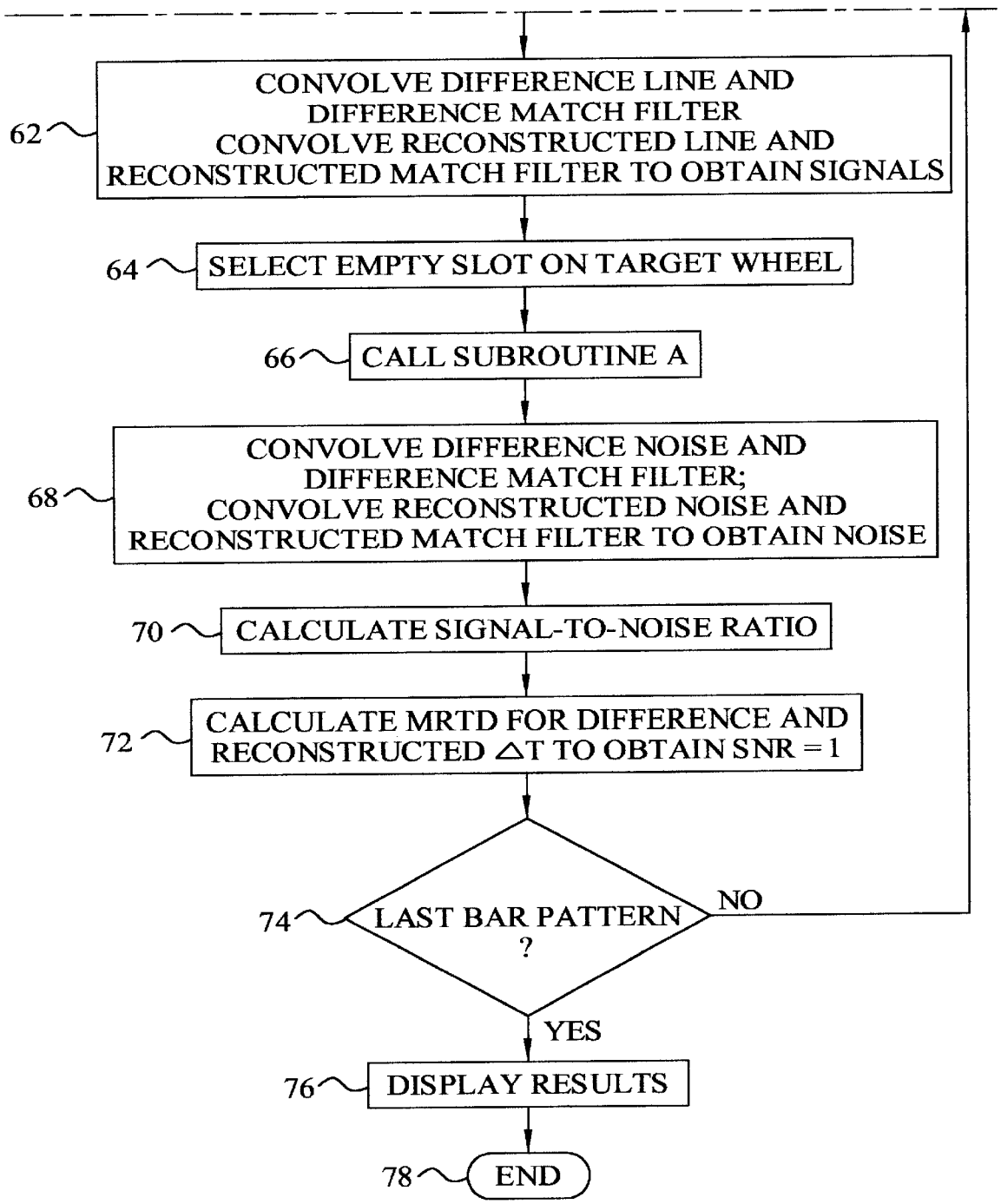

Computer 18 implements an algorithm 40 described with reference to the flowchart presented in FIGS. 4A and 4B. At step 42, computer 18 generates control signal 23 to index target wheel 14 so that selected pattern masks $29_i$ is interposed between energy source 12 and thermal imager 16. Energy signal 15 is transformed into signal 21 by the selected one of pattern masks $29_i$ interposed between energy source 12 and imager 16 whereupon signal 21 may be generally detected by thermal imager 16. At step 44 computer 18 directs thermal energy source via signal 22 to emit sufficient thermal energy 15 to provide a large temperature difference $\Delta T$ between ambient temperature $T_{amb}$ and the temperature of thermal energy source 12, $T_{12}$, where $\Delta T = T_{12} - T_{amb}$. At step 46, transformed signal 17, representing the detected pattern image 33 of bar pattern $29_j$, is input into computer 18 and stored for subsequent analysis.

Figure 6:
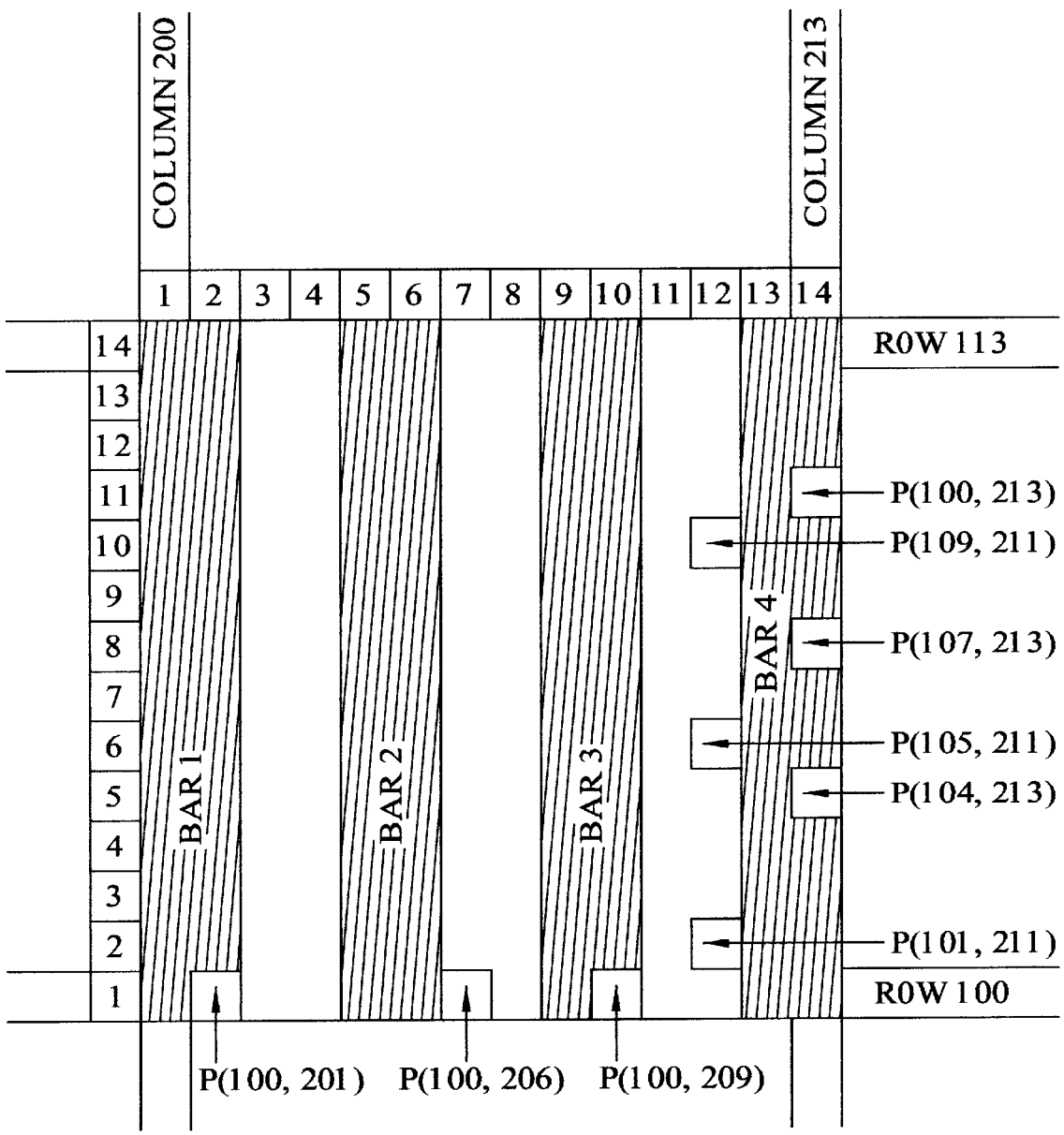
FIG. 6 illustrates the assignment of a Cartesian coordinate system to a four bar image pattern.

Next, algorithm 40 locates and detects the rows and columns bounding bar pattern 33 at step 48. The rows and columns represent pixel intensities of signal 21 detected by thermal imager 16. By way of example as shown in FIG. 6, bar pattern image 33 lies between vertical columns 200 and 213 and horizontal rows 100 and 113. A column average of the pixel intensities is performed using all rows lying between the bounding rows (rows 100 and 113 in this example). Each column average $hc_i$ may be determined at step 50 in accordance with the equation:

$$hc_i = \frac{\sum_{j=100}^{113} P(j, i)}{M},$$

where $hc_i$ is the average pixel intensity value of $i^{th}$ column and M is the total number of rows between the bounding rows (M =14) in this example. A column average of the pixel intensities is performed for all i columns, including columns outside the bounding columns. The effect of the column average is to reduce the two dimensional bar pattern image 33 to a one dimensional high contrast line (hc). Thus, where there are an n number of columns, then hc contains n points (values): $hc_1, hc_2, hc_3, \ldots hc_n$.

Next, algorithm 40 creates high contrast (hcd) difference lines and high contrast reconstructed (hcr) lines at step 52, where: $hcd_i = hc_{i+1} - hc_i$, i ranges between 1 and (n–1); and $hcd_n = 0$. It is to be noted that $hcd_i$ and $hc_i$ are the $i^{th}$ points of the high contrast difference and high contrast lines, respectively. The high contrast reconstruction line $hcr_i$ is defined as follows:

$$hcr_i = \sum_{j=1}^{i} hcd_j,$$

where the $i^{th}$ point ($hcr_i$) is the summation of the high contrast difference line up to and including the $i^{th}$ point of the high contrast difference line.

Proceeding to step 54, algorithm 40 calculates a difference match filter line and a reconstructed match filter line from the high contrast difference and high contrast reconstructed lines. The match filters are constructed by reversing the sequence of points in each of the $hcd_i$ and $hcr_i$ lines as follows:

$dmf_i = hcd_{n-i+1}$ $rmf_i = hcr_{n-i+1}$ where n represents the total number of point in the high contrast lines and subscript i refers to the $i^{th}$ point (value) of the match filter.

At step 56, algorithm 40 convolves the high contrast difference and high contrast reconstructed lines with their corresponding match filters previously determined at step 50 in accordance with the following equations:

$$convd_i = \sum_k dmf_k \times hcd_{i+1-k}$$

$$convr_i = \sum_k rmf_k \times hcr_{i+1-k},$$

where k lies in the range defined by max(1,i+1−n): min(i, n) and where $convd_i$ and $convr_i$ are the $i^{th}$ points (values) of the convolutions. The maximum values of convd and convr then are identified as $convd_{peak}$ and $convr_{peak}$ at step 56. The values $convd_{peak}$ and $convr_{peak}$ are the signal values for the high contrast convolutions. The point of each convolution at which the maximum value occurs (denoted above by "Peak") is referred to as the signal location.

Proceeding to step 58, computer 18 directs thermal energy source 12 via signal 22 to emit thermal energy at the first temperature $T_1$ in a temperature sequence $\{T_i, T_2, T_3 \ldots T_L\}$, where the temperatures sequentially differ by a predetermined increment, $\Delta T_{inc}$. For example, $\Delta T_{inc} = T_2 - T_1$. A pattern image 33 is detected and stored for each temperature $T_i$ in the temperature sequence for a given pattern mask $29_j$, where i and j are indices. Computer 18 may collect a sequence of images which may, for example, have a temperature change from—0.1 to +0.1° C. at increments of +0.01° C. ($\Delta T_{inc}$) Computer 18 commands the frame grabber (not shown) to acquire a bar pattern image 33 associated with a particular pattern mask $29_i$ for each temperature in the sequence. Still at step 58, computer 18 determines if $T_i$ is the last temperature $T_L$ in the temperature sequence, where L is a positive integer. If $T_i$ is equal to $T_L$, then no more images are acquired with a selected one of pattern masks $29_i$. Otherwise computer 18 directs thermal energy source 12 via signal 22 to emit thermal energy at the next temperature ($T_{i+1}$) in the sequence, where $T_2-T_1=\Delta T_{inc}$ and $1 \leq i < L$. Since the location of bar pattern image 33 on thermal imager 16 remains generally unchanged while image sequences of pattern images 33 are recorded, each low contrast bar pattern associated with a pattern mask $29_i$ is bounded by the high contrast rows and columns (columns 200 and 213 rows 100 and 113 in FIG. 6). Computer 18 stores representations of a sequence of low contrast pattern images 33 via signal 17.

Figure 5:
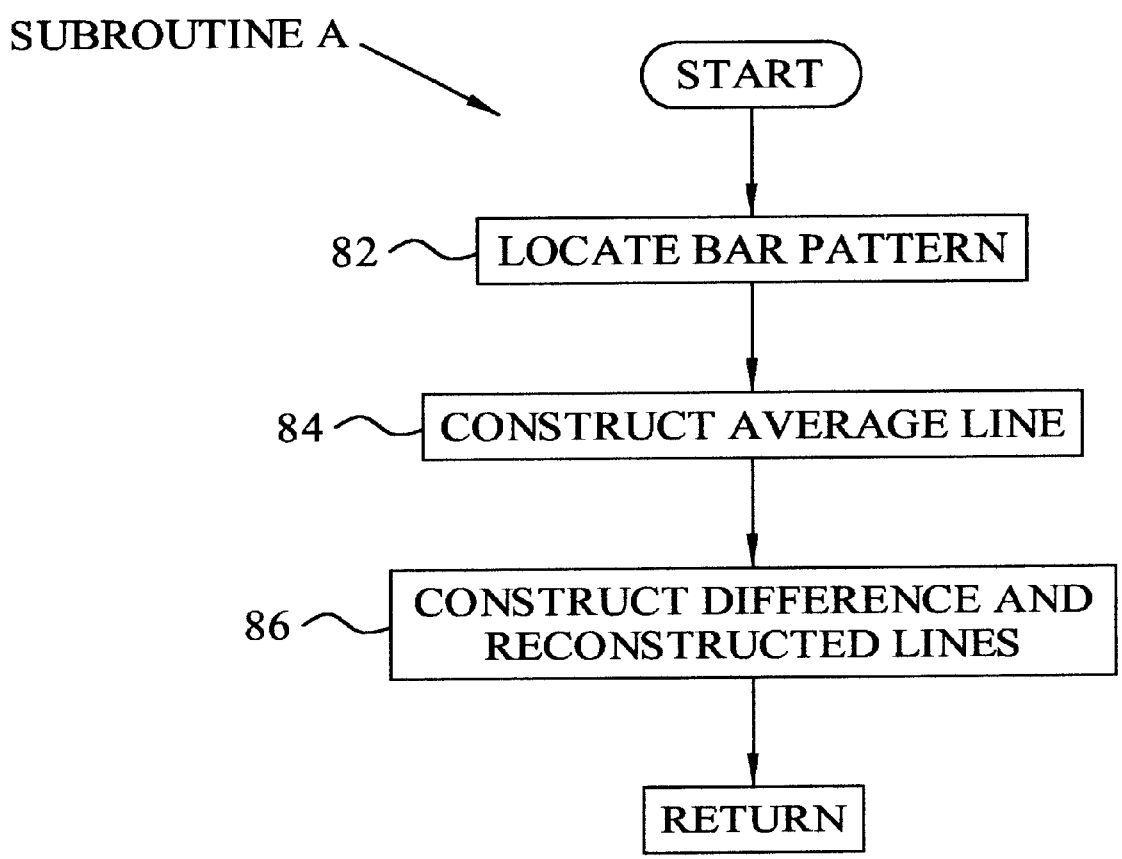
FIG. 5 illustrates Subroutine A of the flow chart of FIGS. 4A and 4B.

Next at step 60, algorithm 40 calls Subroutine A which is applied to each image associated with the temperature sequence $\{T_1, T_2, T_3 \ldots T_L\}$. Subroutine A is described with reference to FIG. 5 and includes: a) step 82 by which a bar pattern image 33 is located or acquired, as described above with reference to step 48; b) step 84 by which an average line is constructed as described above with reference to step 50; and c) step 86 by which difference and reconstructed lines are constructed for the new bar pattern, as described with reference to step 52. At step 60, Subroutine A is applied to each pixel intensity value of the images 33 detected for the temperature sequence $T_1, T_2, T_3 \ldots T_L$. After algorithm 40 locates the bar pattern 33 at step 82, a column average is calculated for each low contrast image as follows:

$$lc_{q,i} = \frac{\sum_{j=100}^{113} P_q(j, i)}{M},$$

where q is an index for the temperature sequence, and i, and j are indices of points in the $q^{th}$ temperature in the temperature sequence, and $P_q(ij)$ represents the detected intensity of a pixel of pattern image 33 at $T_q$. Next, at step 84, low contrast difference $lcd_q$ and reconstructed lines $lcr_q$ are constructed from $lc_q$ for each image in the sequence of images in accordance with the following equations:

$$lcr_{q,i} = \sum_{j=1}^{i} lcd_{q,j}.$$

After exiting Subroutine A, convolutions are performed on each low contrast difference and reconstructed line using the high contrast match filter at step 62 as follows:

$$convld_{q,i} = \sum_{k=1}^{n} dmf_k \times lcd_{q,i+1-k}$$

$$convlr_{q,i} = \sum_{k=1}^{n} rmf_k \times lcr_{q,i+1-k}$$

The results of step 62 are sequences of both difference and reconstructed convolutions. The signals for each convolution in the sequences $convld_q$ and $convlr_q$ are defined as the values of the convolution at the signal location (Peak) of the high contrast convolutions convd, and convr as determined in step 56. The difference and reconstructed signals for the $q^{th}$ convolution are given by $convld_{q,Peak}$, or $convlr_{q,Peak}$, respectively.

Noise values are required to complete the signal to noise calculation. Therefore, at step 64, computer 18 generates signal 23 which directs target wheel 14 to be indexed so as to interpose blank mask 31 or slot between thermal imager 16 and thermal source 12. The noise of thermal imager 16 is determined from images encoded in signal 21 caused by the interaction of slot 31 on signal 15, where no bar pattern is present. At step 66, Subroutine A is called and applied to the images encoded in signal 21 by the interaction of slot 31 on signal 15 to construct noise difference and noise reconstruction lines. Even though no bar pattern is present in the image, such images are processed in the same manner as the images of low contrast bar patterns. A column average, difference and reconstructed lines and convolutions for images associated with slot 31 are determined as follows:

$$u_i = \frac{\sum_{j=100}^{113} P(j, i)}{M}$$

$$ud_i = u_{i+1} - u_i$$

$$ur_i = \sum_{j=1}^{i} ud_j$$

$$convud_i = \sum_{k} dmf_k \times ud_{i+1-k} \text{ and}$$

$$convur_i = \sum_{k} rmf_k \times ur_{i+1-k},$$

where: $u_i$ represents a column noise average;

ud represents a difference noise line;

ur represents a reconstructed noise line;

convud represents a difference noise convolution;

convur represents a reconstructed noise convolution;

dmf represents a difference match filter; and rmf represents a reconstructed match filter, where i,j, k, and n are indices.

Step 68 determines the signal noise associated with the detected pattern images 33. The noise in each measurement is equal to the variance ($\sigma^2$) of the corresponding noise convolutions may be determined as follows:

$$\sigma^2 = \frac{1}{P-1} * \sum_{k=p}^{p+(P-1)} [convu_k^2 - (\overline{convu})^2],$$

where $convu_k$ is the $k^{th}$ point in the difference (or reconstructed) noise convolution, convu represents the average value of the convolution; and P represents the number of points used to determine the variance, and p represents the first non-zero point in the convolution and is used for determining the variance. P also is the number of points between the first and last non-zero points in the convolution. Step 70 further determines the signal to noise ratio, SNR, from the square of the signal noise, $\sigma^2$ as follows:

$$SNR = \frac{signal}{\sqrt{\sigma^2}},$$

where signal can be either the difference and reconstructed signal (convld$_{q.peak}$, or convlr$_{q.peak}$) and $\sigma^2$ represents the corresponding noise variance. A difference and reconstructed value for SNR is obtained for each image of the low contrast sequence. The result is a table of difference and reconstructed SNR values as a function of the temperature difference.

Proceeding to step 72, algorithm 40 determines the minimum resolvable temperature difference (MRTD) for the particular mask pattern 29$_i$ under test. The MRTD is defined as the temperature difference (or contrast) whereby SNR=1. Typically, SNR is proportional to $\Delta T$. The linear equation has the form: SNR=$\beta\Delta T$+b, where $\beta$ represents the slope of line, $\Delta T$ represents the temperature difference 17 between thermal source 12 and the mask 14.1, and b represents the y-intercept. Setting SNR=1, then $$MRTD = \Delta T = \frac{(1-b)}{\beta}.$$

A linear square fit may be applied to the difference and reconstructed data to determine $\beta$ and b.

At step 74 a determination is made as to whether a new bar pattern is to be tested. If the determination is YES, then algorithm 40 returns to step 42. If, however, the determination at step 74 is NO, then at step 76, algorithm 40 causes computer 18 to generate an MRTD display signal 26 that is presented in human readable form by display 25, which may be a printer or video monitor. Algorithm 40 ends at step 78. An example of a computer program for implementing algorithm 40 is presented by way of example in Appendix 1 and is written in MATLAB®.

Obviously, many modifications and variations of the present invention are possible in light of the above teachings. For example, the invention describes the determination of MRTD values using either of the difference or reconstructed signal lines. However, each of these techniques may produce different results for the same input data. Whether to use the reconstructed or difference signal lines, or even a combination of both depends on the requirements of a particular application. It is therefore to be understood that within the scope of the appended claims, the invention may be practiced otherwise than as specifically described.

I claim:

1. A for method determining the minimum resolvable temperature difference of a thermal imager, comprising the steps of:

generating a reference radiant energy signal at a temperature $T_s$ in an environment having a temperature $T_{amb}$;

defining a reference radiant energy pattern from the reference radiant energy signal;

using a thermal imager for detecting and transforming the reference radiant energy pattern into a reference image signal;

defining a one dimensional reference difference representation of the reference radiant energy pattern from the reference image signal;

defining a matched filter from the one dimensional reference difference representation;

generating a sequence of L sample radiant energy signals $S_i$ at a sequence of temperatures $T_i$, where L is a positive integer, i is an integer index, and $1 \leq i \leq L$;

defining a sample radiant energy pattern $P_i$ for each sample radiant energy signal $S_i$;

detecting and transforming each sample radiant energy pattern $P_i$ into a sample image signal SIG$_i$;

defining one dimensional sample difference representations $R_i$ of the sample radiant energy pattern $P_i$ from each sample image signal SIG$_i$;

determining signal-to-noise ratios for each sample difference representation $R_i$ by convolving the matched filter with each sample difference representation $R_i$; and determining the minimum resolvable temperature difference of the imager from the signal-to-noise ratios.

2. A method for determining the minimum resolvable temperature difference of a thermal imager, comprising the steps of:

generating a reference radiant energy signal at a temperature $T_s$ in an environment having a temperature $T_{amb}$;

defining a reference radiant energy pattern from the reference radiant energy signal;

using a thermal imager for detecting and transforming the reference radiant energy pattern into a reference image signal;

defining a one dimensional reference reconstructed representation of the reference radiant energy pattern from the reference image signal;

defining a matched filter from the one dimensional reference reconstructed representation;

generating a sequence of L sample radiant energy signals $S_i$ at a sequence of temperatures $T_i$, where L is a positive integer, i is an integer index, and $1 \leq i \leq L$;

defining a sample radiant energy pattern $P_i$ for each sample radiant energy signal $S_i$;

detecting and transforming each sample radiant energy pattern $P_i$ into a sample image signal SIG$_i$;

defining one dimensional sample reconstructed representations $R_i$ of the sample radiant energy pattern $P_i$ from each sample image signal SIG$_i$;

determining signal-to-noise ratios for each sample reconstructed representation $R_i$ by convolving the matched filter with each sample reconstructed representation $R_i$; and determining the minimum resolvable temperature difference of the imager from the signal-to-noise ratios.

* * * * *